United States Patent [19]

Cardinal, Jr.

[11] 4,197,162
[45] Apr. 8, 1980

[54] SOLAR HEATING USING THE TIDE

[76] Inventor: Daniel E. Cardinal, Jr., 1352 Estate La., Lake Forest, Ill. 60045

[21] Appl. No.: 21,545

[22] Filed: Mar. 19, 1979

Related U.S. Application Data

[63] Continuation of Ser. No. 851,978, Nov. 16, 1977, abandoned, which is a continuation-in-part of Ser. No. 754,410, Dec. 27, 1976, abandoned.

[51] Int. Cl.² .............................................. B01D 3/00
[52] U.S. Cl. ................................. 202/234; 159/15 F; 203/DIG. 1; 417/331
[58] Field of Search ................. 417/330, 331, 53, 100, 417/334, 329; 60/398, 498; 159/15 F; 203/DIG. 1; 202/234, 83

[56] References Cited

U.S. PATENT DOCUMENTS

| | | | |
|---|---|---|---|
| 2,820,744 | 1/1958 | Lighter | 159/15 F |
| 3,351,536 | 11/1967 | Fox | 202/234 |
| 3,487,228 | 12/1969 | Kriegel | 417/331 |
| 3,960,668 | 6/1976 | Rush | 202/234 |

Primary Examiner—Hiram H. Bernstein
Attorney, Agent, or Firm—Andrus, Sceales, Starke & Sawall

[57] ABSTRACT

A fixed tank is disposed in the sea adjacent a floating solar still, with a flexible conduit extending between a lower portion of the tank and the interior of the still. A one-way check valve disposed in the lower portion of the tank permits sea water to enter the tank and fill it as the tide rises. As the tide lowers, water flows from the tank through a restriction in the conduit to the solar still.

6 Claims, 3 Drawing Figures

SOLAR HEATING USING THE TIDE

This is a continuation of application Ser. No. 851,978, filed Nov. 16, 1977 and now abandoned which in turn is a continuation-in-part of application Ser. No. 754,410, filed Dec. 27, 1976, now abandoned.

BACKGROUND AND SUMMARY OF THE INVENTION

This invention relates to solar heating of water wherein the tide is utilized to provide water to a solar still.

Solar stills have long been known for using the heat from the sun to distill sea water into fresh water. An example of such a still is disclosed in U.S. Pat. No. 3,351,536 issued Nov. 7, 1967. In that still, the apparatus floats on the surface of the sea and utilizes a lens-type dome for concentrating the rays of the sun on the water within the still from distillation purposes.

It is, of course, required that water within the still must be replenished as it distills off.

The task of the present invention is to supply sea water to the still without the need for an external man-made power source, such as a pump or the like.

Broadly, the present inventor's solution to the task is to harness the energy of the tides to thereby provide the force for replenishing the still with sea water.

More specifically, it is contemplated that a fixed tank is disposed in the sea adjacent a floating solar still, with a flexible conduit extending between a lower portion of the tank and the interior of the still. A one-way check valve disposed in the lower portion of the tank permits sea water to enter the tank and fill it as the tide rises. As the tide lowers, water flows from the tank through a restriction in the conduit to the solar still.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
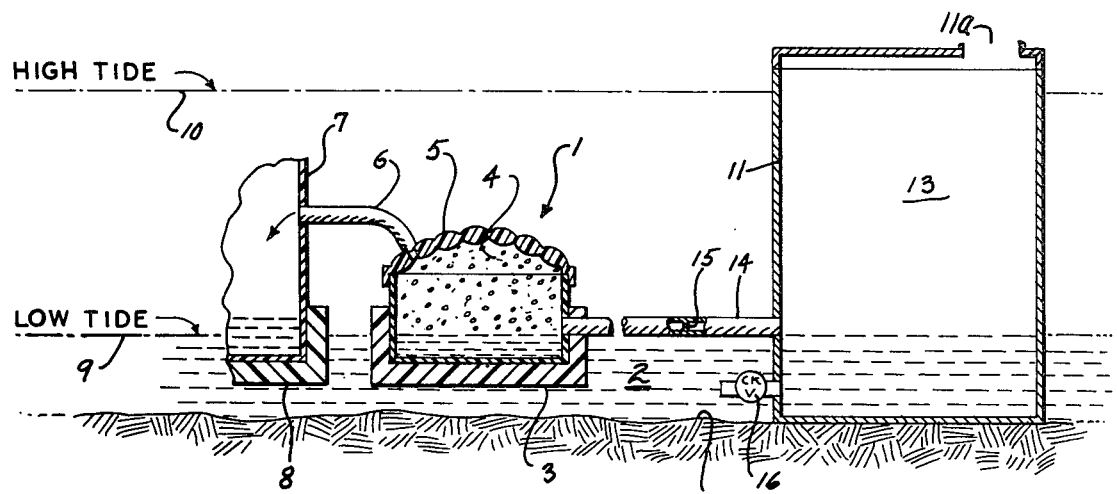
FIG. 1 is a schematic view of a solar still and supply tank, with the level of the sea at low tide.

As shown in FIG. 1 of the drawings, a solar still 1 is mounted to float on the surface of the sea 2, as by support 3 which may be constructed of light weight floatable foam-like material. Still 1 contains a chamber 4 adapted to receive sea water, and has means for heating the water to distillation temperatures. For this purpose, and in the embodiment shown, a lens-type dome 5 covers chamber 4 and is of a type similar to that disclosed in the aforementioned U.S. Pat. No. 3,351,536. Heat from the sun passes through dome 5 and causes the sea water within to boil, with the distillate passing outwardly through a conduit 6 to a condensation and storage tank 7 which also floats on the sea 2 as by a light weight foam-like floatable support 8.

Solar still 1 and tank 7 float upwardly and downwardly on the water between low tide and high tide poistions 9 and 10 respectively.

It is contemplated that sea water be supplied to still 1 in accordance with the action of the tide. For this purpose, an enclosed receptacle 11 having an air vent 11a in its top is fixed in position, as by mounting on the sea floor 12. Receptacle 11 extends upwardly from floor 12 to at least above low tide position 9 and preferably slightly above high tide position 10, and provides a flow-through water chamber 13. A flexible supply conduit 14 extends from the wall of receptacle 11 just above the low tide line 9 to the wall of still 1, thereby connecting chambers 4 and 13. A restriction 15 is disposed in conduit 14 for purposes to be described. In addition, means are provided to permit passage of water from the sea into but not out of receptacle 11. In the embodiment shown, a one way check valve 16 is disposed in the receptacle wall below low tide line 9 and the level of conduit 14, and permits water to flow inwardly only during a rising tide.

In the view of FIG. 1, sea 2 is at low tide and the water within still 1 and receptacle 11 is at the same level. However, during distillation, the water within still 1 may lower.

Figure 2:
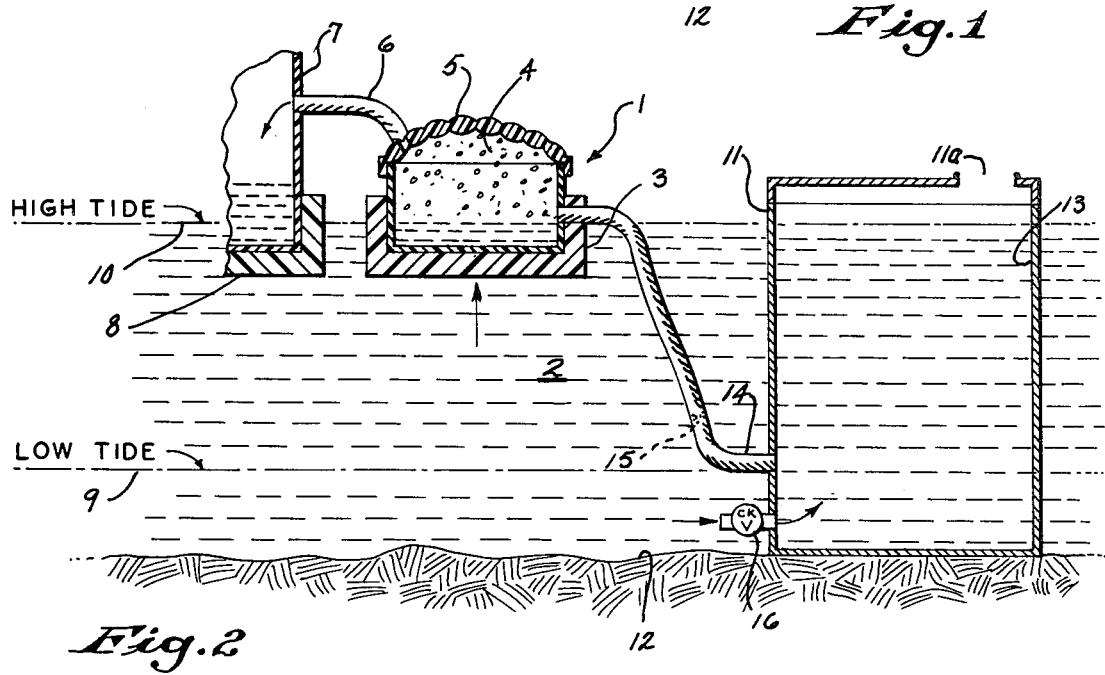
FIG. 2 is a similar view as the tide rises to its highest position.

Referring now to FIG. 2, as the sea water moves and rises toward the high tide level 10, still 1 and tank 7 rise along with the water. At the same time, sea water flows into receptacle 11 through check valve 16. The air in receptacle 11 will discharge through vent 11a. However, the level of water within chambers 4 and 13 remains the same as the surface of sea 2, so no water flows through conduit 14.

Figure 3:
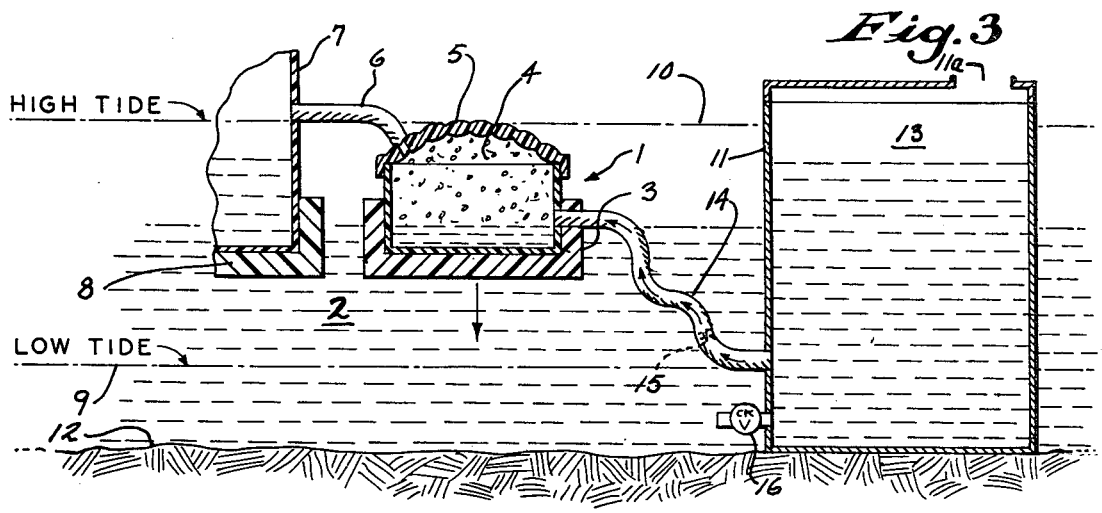
FIG. 3 is a similar view as the tide again lowers to its lowermost position.

Referring to FIG. 3, as the sea water moves toward low tide level 9, still 1 and tank 7 lower along with the water. However, water within chamber 13 cannot escape outwardly through check valve 16. This water can, however, now flow outwardly from chamber 13 through conduit 14 to chamber 4, with air flowing in through vent 11a. Restriction 15 in the conduit provides a means whereby the water level within chamber 13 lowers slower than the lowering of the tide, thus causing a differential in levels to maintain the water flow uphill through conduit 14 until the conditions have returned to those shown in FIG. 1.

The concept of the invention thus provides a means responsive only to lowering of the tide to automatically supply sea water to a solar still. The supply to still 1 is intermittent, because no water is supplied during rising of the tide.

Various modes of carrying out the invention are contemplated as being within the scope of the following claims particularly pointing out and distinctly claiming the subject matter which is regarded as the invention.

I claim:

1. In an apparatus for supplying sea water to a solar still floating on the surface of the sea, means connected to said still and responsive to the tidal movement of said sea to automatically supply sea water to said still, said means comprising:

(a) a receptacle disposed in the sea and fixed in position relative to the sea floor, (b) one way valve means to permit flow of sea water into said receptacle only when the sea level and said still are rising, (c) a flexible conduit extending between said receptacle and said still for passing water from said receptacle to said still when the sea level and said still are lowering, (d) and means restricting the flow of water in said conduit when the sea level and said still are lowering so that the water in said receptacle lowers slower than the lowering of the sea level and said floating still.

2. The apparatus of claim 1 wherein said valve means is disposed in the wall of said receptacle below the low tide level of the sea.

3. The apparatus of claim 1 wherein said flexible conduit is connected to said receptacle above the low tide level of the sea.

4. The apparatus of claim 1 wherein:
(a) said valve means is disposed in the wall of said receptacle below the low tide level of the sea,
(b) and said flexible conduit is connected to said receptacle above the low tide level of the sea and above the level of said valve means.

5. The apparatus of claim 1 wherein said receptacle is mounted on the bottom of the sea and extends upwardly to above the level of low tide.

6. The apparatus of claim 5 wherein said receptacle extends upwardly to at least the level of the sea at high tide.

* * * * *